United States Patent [19]

Durr et al.

[11] 4,425,474

[45] Jan. 10, 1984

[54] PULP-INSULATED CONDUCTOR CABLE

[75] Inventors: Helmut E. Durr, Dunwoody; Charles B. Heard, Jr., Lawrenceville, both of Ga.

[73] Assignee: Western Electric Company, Inc., New York, N.Y.

[21] Appl. No.: 315,376

[22] Filed: Oct. 27, 1981

Related U.S. Application Data

[63] Continuation-in-part of Ser. No. 117,164, Jan. 31, 1980, abandoned.

[51] Int. Cl.³ .............................................. H01B 3/48
[52] U.S. Cl. ............................ 174/110 F; 162/106; 174/113 C; 174/122 R; 174/124 R
[58] Field of Search ........... 174/110 F, 113 C, 120 C, 174/121 B, 121 R, 122 C, 122 R, 124 G, 124 R; 162/106

[56] References Cited

U.S. PATENT DOCUMENTS

| | | | |
|---|---|---|---|
| 1,615,422 | 1/1927 | Walker et al. | 174/124 R X |
| 2,051,423 | 8/1936 | Schacht | 174/122 R |
| 2,187,391 | 1/1940 | Borgeson | 174/122 |
| 2,440,802 | 5/1948 | Krogel | 174/124 R X |
| 3,917,901 | 11/1975 | Jones | 174/110 F |
| 3,985,951 | 10/1976 | Harris | 174/110 F |
| 3,986,253 | 10/1976 | Harris | 174/110 F X |
| 4,058,669 | 11/1977 | Nutt et al. | 174/34 |
| 4,113,534 | 9/1978 | Pound et al. | 174/124 R X |
| 4,125,645 | 11/1978 | Jukes et al. | 174/124 R |
| 4,183,692 | 1/1980 | Durr | 403/275 |
| 4,218,285 | 8/1980 | Durr et al. | 162/106 |

FOREIGN PATENT DOCUMENTS 1401931 8/1975 United Kingdom ................. 156/51

OTHER PUBLICATIONS

Windeler, A. S., "Polyethylene-Insulated Telephone Cable," Nov. 1955 pp. 1-12 relied on.
Britz & Kleing, "Manufacturing Pulp Cable", Western Electric Engineer, Jul.-Oct. 1971 at pp. 86-94.

Primary Examiner—R. R. Kucia
Attorney, Agent, or Firm—E. W. Somers

[57] ABSTRACT

A cable of this invention includes a number of pulp-insulated conductor pairs per unit of cable cross-sectional area which is substantially greater than in prior art cables. Each pulp-insulated conductor includes a metallic conductor enclosed in a composite insulation cover which has a controlled dielectric constant and a controlled adhesion of the cover to the conductor. The composite cover comprises a pulpous material and a layer of adhesive material which is interposed between the conductor and the pulpous material. The layer of the adhesive material bonds the pulpous material to the conductor and allows a reduced thickness of pulpous material without degrading the transmission characteristics of the cable. Also, the mechanical integrity of the insulation cover permits the moisture content of the pulpous material to be reduced and the density increased over that achieved in prior art pulp-insulated conductors without causing bare spots in the insulation. The changes in moisture content and density reduce the compressibility of the insulation. This is of help in maintaining a suitable mutual capacitance for the cable as well as allowing increased packing of conductor pairs without displacing insulation.

11 Claims, 11 Drawing Figures

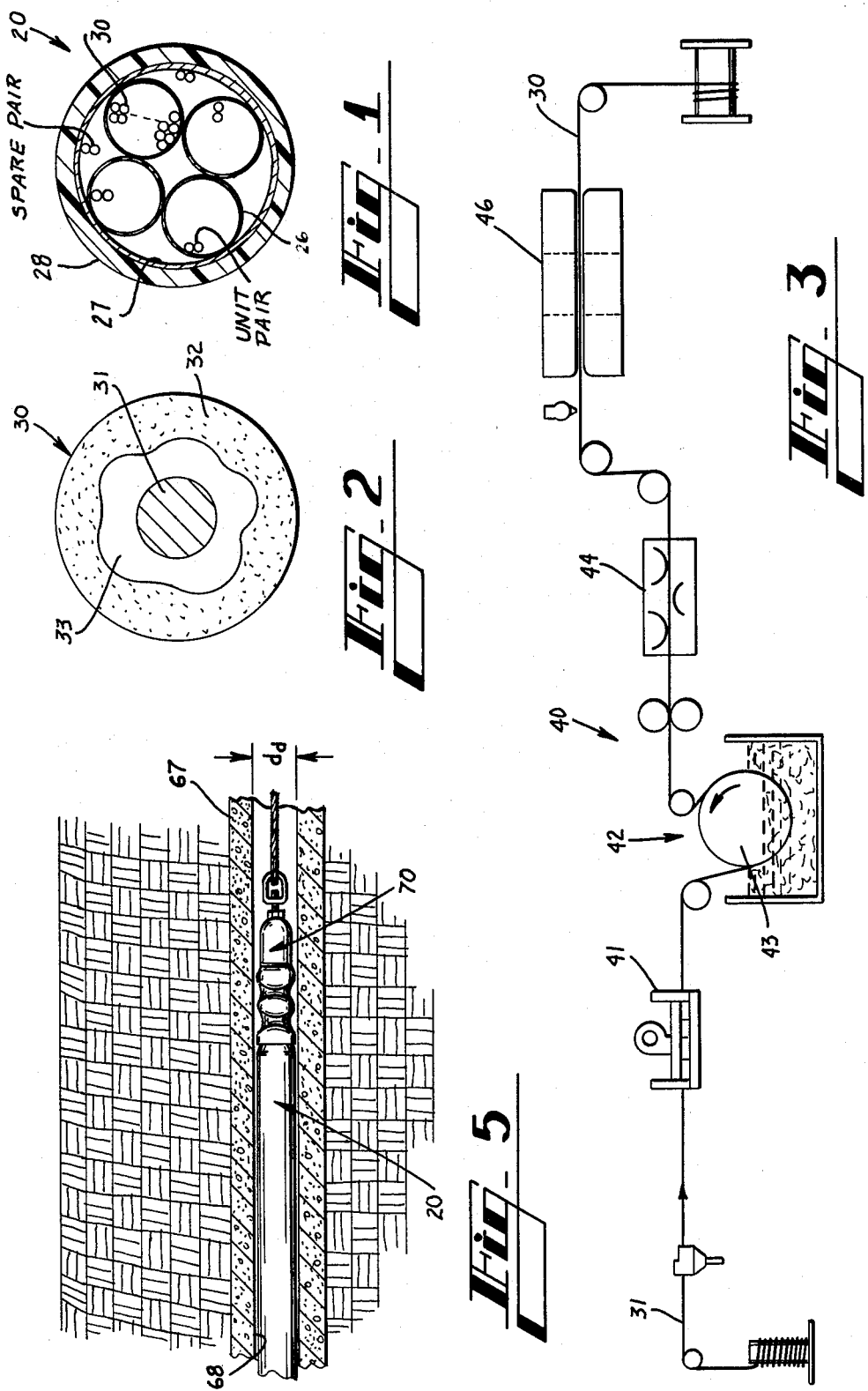

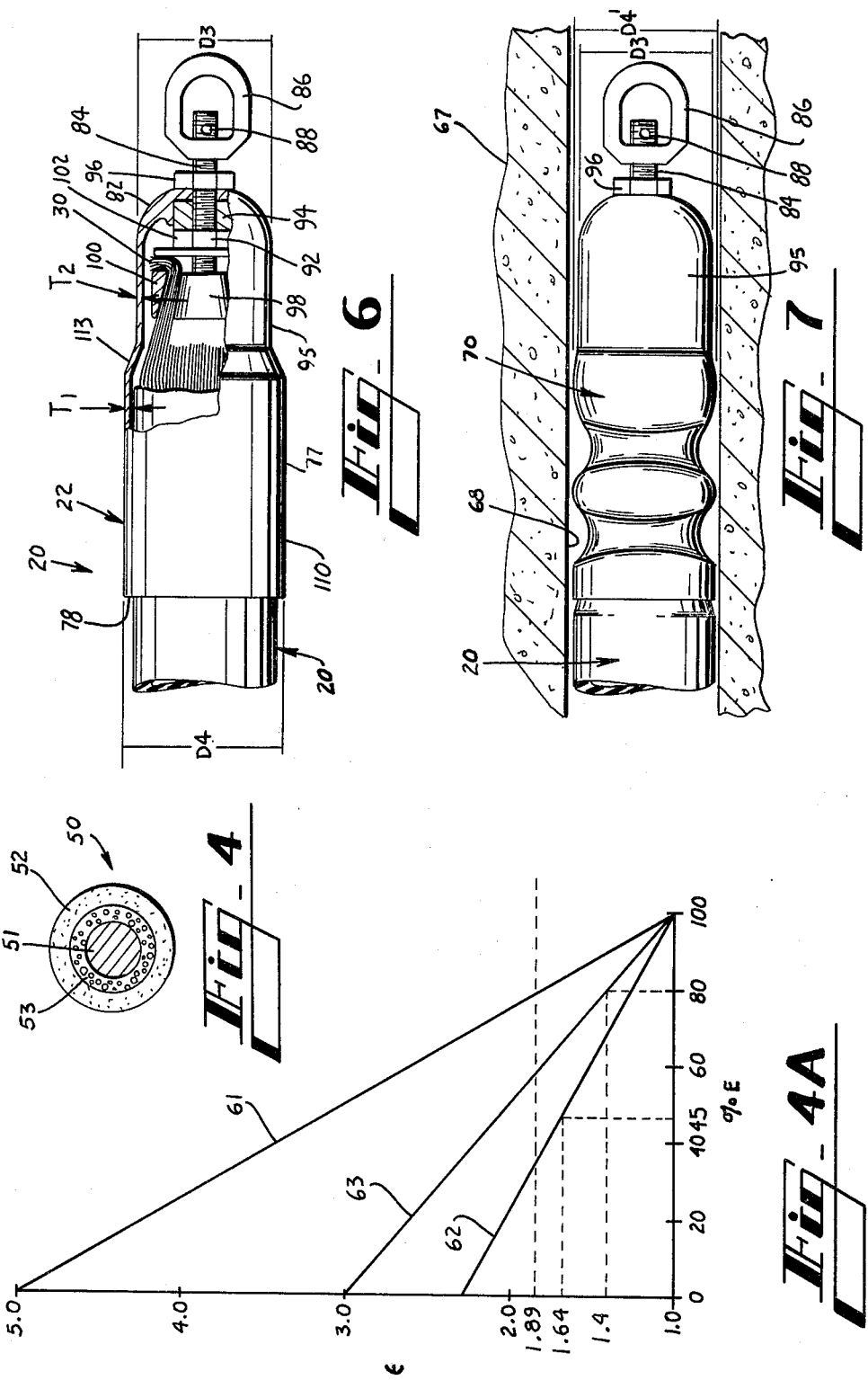

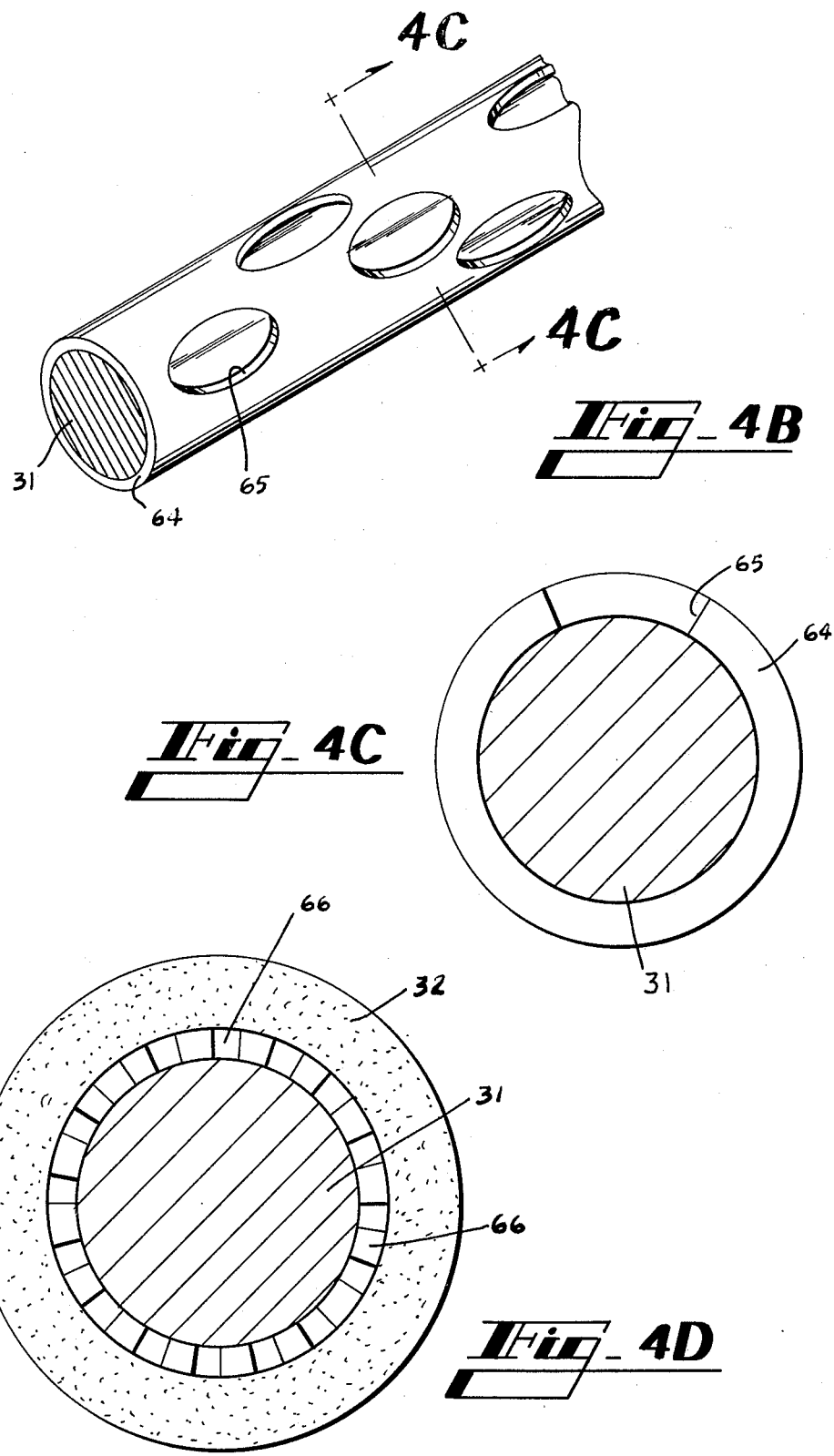

PULP-INSULATED CONDUCTOR CABLE

CROSS REFERENCE TO RELATED APPLICATIONS

This application is a continuation-in-part application of Application Ser. No. 117,164 which was filed on Jan. 31, 1980 in the names of Helmut Emil Durr and Charles Bean Heard, Jr. now abandoned.

TECHNICAL FIELD

This invention relates to a pulp-insulated conductor cable and, more particularly, to pulp insulated cable systems which are particularly suited for use between telephone central offices in high density traffic metropolitan areas.

BACKGROUND OF THE INVENTION

Many of the transmission paths between telephone central offices in larger cities in this country are by way of multipair cable. A multipair cable typically consists of 24 and 26 gauge pulp-insulated conductors for voice frequency paths, and 22-gauge pulp-insulated conductors for carrier circuits.

Pulp-insulated conductor cable has been the industry's standard for such short-haul routes because of its relatively low cost and its close packing. It provides an optimally large number of conductor pairs per unit cross-section of cable because of the relatively low dielectric constant of pulpous insulation. Also, there is continuing availability of the pulpous material as opposed to the increasing dependence on foreign sources for a petroleum derivative from which plastic insulating materials are made. A further advantage of pulp insulation is its ability to absorb moisture which localizes water at a fault point and facilitates the use of routine electrical tests to accurately locate the fault. A detailed description of a pulp-insulating process can be had by referring, for example, to an article "Manufacturing Pulp Cable", on pages 86–94 of the July–October 1971 issue of *The Western Electric Engineer*.

A pulp-insulated cable may contain as many as several thousand pairs of conductors. A conductor is covered with pulp insulation, and two insulated conductors are twisted into a pair. Pairs are then grouped into units, and units are assembled into cores. The cores are sheathed, for example, with a paper wrap and an overlay of aluminum, then steel, a flooding compound, and an outer plastic jacket. A typical prior art 3,600 pair cable of 26-gauge copper conductor has an outside diameter of 8.64 cm and a 3,000 pair cable, 7.59 cm.

With the increase in telephone traffic, a need has arisen to increase the capacity of short-haul, underground pulp-insulated cables. In some cities there is very little space for new ducts for the installation of new underground cable. Certain utilities, which have priority over telephone cables, occupy the portion of the underground space which is nearest street level. The result is that telephone cables are placed beneath other utility lines and in certain instances have extended well below street level. When it is necessary to add telephone cables, it is very difficult and expensive or impossible to locate new ducts below the existing ones.

Inasmuch as the installation of additional ducts is not attractive as a solution to the problem of increased underground capacity and the duct limits the diameter of the cable that can be installed, a new approach becomes necessary. Thought has been given to the use of a cable having an increased pair density of pulp-insulated conductors which could be used in existing ducts. Such a cable would require the use of less metal overlay material, less flooding compound, and less jacket material.

In order to provide a higher pair density pulp cable to reduce cable diameter for a given number of pairs or to provide a greater number of pulp-insulated conductors in an existing duct, it should be apparent that the outer diameter of each insulated conductor must be reduced. This has not been done because of the occurrence of uninsulated areas along the presently made conductors. These occur either because of a lack of adherence of the pulpous material to the conductors during insulating and because of the abuse to which the insulation is subjected in steps of a cable-making process subsequent to insulating.

The frequency of uninsulated areas along the conductor has been reduced by increasing the thickness of the pulp insulation. In fact, it also has been customary to provide spare pairs of conductors to supplant conductors which have such defects and are unusable for telecommunications. These solutions are counter-productive to today's goals because they increase the size of the cable cross-section and necessitate additional plastic jacketing material without an accompanying benefit in capacity.

Recently, a pulp-insulated conductor which has substantial mechanical integrity over that of prior art pulp conductors was introduced to the art. It is disclosed in U.S. Pat. No. 4,218,285 which issued on Aug. 19, 1980, in the names of H. E. Durr et al. Briefly, a metallic conductor is enclosed in a composite insulation cover comprising an adhesive coating and pulpous material. The adhesive coating bonds the pulpous material to the conductor.

The above-identified Durr et al arrangement provides consistent adhesion of the pulp-insulation to the conductor and provides improved mechanical properties. However, the dielectric constant of the adhesive coating between the conductor and the pulpous material is greater than the dielectric constant of the pulpous material. Undesirably, this causes the dielectric constant of the composite insulation to be increased.

The dielectric constant is a property of the conductor insulation which affects the transmission characteristics of a cable. For example, the mutual capacitance, $C_m$, is that capacitance characteristic in a telephone cable which affects transmission characteristics, is a function of the dielectric constant, and is inversely proportional to the center-to-center distance between conductors of each pair. The mutual capacitance of a cable is the average of the mutual capacitances of the pairs. (See F. W. Horn, *ABC of the Telephone Cable, Inside and Out*, pp. 1–3, Vol. 5).

Seemingly, the dielectric properties of the composite insulation and hence the capacitance characteristics of the cable would deteriorate still further if the thickness of the pulp insulation were to be reduced in order to provide an increased number of conductors in a given core size. Therefore, any increase in pair density through a reduction in the outer diameter of adhesive-coated pulp-insulated conductors must be accomplished within the framework of a suitable dielectric constant of the composite insulation and an acceptable mutual capacitance characteristic.

Another problem with respect to maximizing the use of existing underground ducts is the size of pulling eyes that are attached to cable ends and that are used to pull the cables through the ducts. The outside diameter of the cable pulling eyes generally has been greater than that of the cables to which the eyes are attached. As a result, additional space which otherwise could accommodate additional cable capacity remains within the duct about the cable.

A pulling eye having an outer diameter equal to that of the cable is shown in H. E. Durr U.S. Pat. No. 4,183,692 which issued on Jan. 15, 1980, which is incorporated by reference hereinto. While enough added pairs might be added to serve present needs by using this pulling eye, the solution would only be temporary and additional capacity most likely would be required in the not too distant future.

What is required is a cable system having an increased pulp-insulated conductor pair density which is capable of being received in existing underground ducts and which has acceptable mutual capacitance characteristics. The prior art has addressed part of this problem, and in U.S. Pat. No. 4,113,534 methods are disclosed for making pulp-insulated conductors with specific pulp fiber lengths and freeness ratios as well as specific process parameters.

SUMMARY OF THE INVENTION

The foregoing problems of the prior art have been overcome by a cable and a cable system of this invention which is capable of being used in an existing underground duct and capable of providing an increased number of circuit paths.

The cable of this invention includes a plurality of pairs of pulp-insulated conductors, each of the conductors of each of the pairs comprising an elongated metallic conductor, and an insulation cover which encloses the electrical conductor. The insulation cover includes a layer of pulpous material which is concentrically disposed about the conductor, and a coated adhesive layer which is interposed between the conductor and the pulpous material and which is capable of being treated to bond the pulpous material to the conductor. As a result, the thickness of the pulpous material and hence the outer diameter of each insulated conductor can be reduced over that of conductors which do not include an adhesive coating. This allows a greater pair density per unit area of a finished cable.

The dielectric constant of the insulation cover is controlled to offset the effect of the relatively high dielectric constant of the adhesive layer. This may be accomplished by using a relatively thin adhesive coating or by using an increased thickness adhesive coating which is effectively cellular.

Because of the improved mechanical integrity of the insulation cover, its moisture constant can be reduced and its density increased. These parameters are helpful in maintaining a desired center-to-center spacing of the metallic conductors of a twisted pair. This results in a mutual capacitance of each conductor pair and hence of the cable which is substantially equal to that of conventional pulp-insulated conductor pairs. This also allows a greater packing of the conductor pairs and supplements the reduced insulation thickness to cause a still further reduction in cable diameter.

A cable system which is particularly suitable for use in an existing underground duct includes a cable of this invention and also includes a pulling eye assembly having a tubular shell that is adapted to receive an end portion of the cable. The tubular shell is such that its outside diameter does not exceed that of the cable.

BRIEF DESCRIPTION OF THE DRAWINGS

Other features of the present invention will be more readily understood from the following detailed description of specific embodiments thereof when read in conjunction with the accompanying drawings, in which:

FIG. 1 is a cross-sectional veiw of a cable of this invention;

FIG. 2 is a cross-sectional end view of a pulp-insulated conductor, a plurality of pairs of which can be grouped together to form the cable of this invention;

FIG. 3 is a schematic view of a manufacturing line for pulp insulating simultaneously each of a plurality of conductors;

FIG. 4 is a cross-sectional end view of an alternative embodiment of a pulp-insulated conductor which may be used to form the cable of this invention;

FIG. 4A is a graph showing plots of dielectric constant versus percent expansion for each of several insulating materials;

FIG. 4B is a perspective view of another embodiment of a conductor that is covered with an effectively cellular layer;

FIG. 4C is a cross-sectional end view of the conductor shown in FIG. 4B and taken along line 4C—4C thereof;

FIG. 4D is a cross-sectional end view of still another embodiment of a pulp-insulated conductor in accordance with this invention;

FIG. 5 is a side elevational view partially in section of a cable system which includes a cable of this invention and a pulling eye for use in an underground duct;

FIG. 6 is a cross-sectional view of a cable pulling eye into which extends one end of a cable which comprises a plurality of pulp-insulated conductors of that shown in FIG. 2 or FIG. 4; and FIG. 7 is a cross-sectional view of the cable pulling eye of FIG. 6 after it has been attached to the cable to form a cable system of this invention.

DETAILED DESCRIPTION

Referring now to FIG. 1, there is shown a cable 20 of this invention which includes a core that comprises a plurality of twisted pairs of pulp-insulated conductors 30-30. The pairs may be arranged in units, each of which is wrapped with a binder 26. A plurality of cores are enclosed in a corrugated metallic shield 27 and a jacket 28 of a plastic material. While this invention will be described to provide a cable system of increased capacity in an existing underground duct, it should be understood that it could also be used to provide the same number of pairs in a smaller diameter cable.

The cable 20 of this invention advantageously is capable of being used in existing underground ducts and includes significantly more insulated conductor pairs per unit of cable cross-section area than prior art cables. In order to achieve these results while retaining what is thought to be a required jacket thickness, it is necessary to reduce the diameter-over-dielectric (hereinafter referred to as DOD) measurement of each pulp-insulated conductor. Also, the dielectric properties of the conductor insulation cover must be controlled to preserve the capacitance characteristics of conventional pulp-insulated conductor cable.

Referring now to FIG. 2 there is shown a pulp-insulated conductor 30 which includes a copper conductor 31 that is covered with a pulpous insulation material 32. The pulpous insulation 32 is caused to adhere to the conductor 31 by a layer 33 of a material which is coated on the conductor prior to the application of the pulpous material. The pulpous insulation 32 and the coated layer 33 are applied to the conductor 31 in a process as disclosed in hereinbefore identified Durr et al U.S. Pat. No. 4,218,285 which is incorporated by reference hereinto.

The material which is used to coat each conductor 31 must be such that when initially treated, such as, for example, by exposure to a first temperature for a predetermined time, it becomes capable of remaining on the conductor 31 while a pulpous material is applied thereover. When further treated, such as, for example, by exposure to a second temperature for a predetermined time, it must be capable of creating or increasing an adehsive bond between the pulpous material 32 and the conductor 31.

It has been found that an acrylic adhesive, and, more particularly, an aqueous emulsion of an acrylic polymer is ideal for purposes of this invention. An ethyl acrylate-methyl acrylate copolymer such as that marketed by Rohm and Haas Company under the designation HA-12 has been found to be especially suitable. Apparatus for coating each of a plurality of conductors 31-31 with the adhesive material is shown in U.S. Pat. No. 4,281,617 which issued on Aug. 4, 1981, in the names of R. Bevers et al.

After the conductors 31-31 have been coated individually with the layer 33, they are advanced through an oven 41 (see FIG. 3) which is designed to partially dry the adhesive material. The partial drying of the adhesive material initiates a curing process.

After the coated conductors 31-31 have passed through the oven 41, an insulation cover of pulpous material is formed about each. The forming steps are controlled to cause the insulation cover about each conductor to have a predetermined density and moisture content.

In a vat 42, ribbons of pulp are formed on a cylinder mold 43 and the conductors 31-31 are guided so that one conductor is embedded in the center of each ribbon as formed. After the wet, paper-pulp ribbons have been formed in engagement with the adhesively coated conductors 31-31, they are passed between press rolls where excess water is removed to reduce the moisture content of each of the pulp ribbons to about 80%. The ribbons at this point are about 0.79 cm wide and form an insulation thickness that varies from 0.18 to 0.41 mm depending on conductor size.

Then, a wet ribbon having a conductor 31 embedded therein is turned around the conductor by passing it through a high speed rotating polisher 44 which is conventional in the art, to form a layer 32 of pulp insulation having a moisture content of about 70%. The conductor 31 enclosed within superimposed concentric layers 33 and 32 of adhesive and pulpous materials, respectively, is designated generally by the numeral 30.

The wet insulation is dried through controlled evaporation to a final moisture content of about 3 to 7% and the layer 33 is further treated by passing the pulp-insulated conductor through an oven 46. As each conductor 31 is advanced through the final oven, the partially treated adhesive coating 33 "softens", especially at the interface with the pulp layer. The exposure for a predetermined time to the temperatures within the oven 46 tackifies further the layer 33 and permits the pulpous material to penetrate into and become adhered thereto. This results in a pulp-insulated conductor 30 in which there is an intermingling between the initial adhesive layer 33 and the pulpous material at their interface.

The use of the coating adhesive 33 causes the pulpous material to be bonded to the conductor 31 with measurable values of adhesion. Adhesion of the pulpous material to a conductor 31 is measured by stripping the pulpous material except for a 1.9 cm portion from a 5.7 cm length of conductor. Then the bared end of the conductor is pulled through an orifice in a plate until the insulation abuts the plate. The movement of the conductor 31 is continued at a rate of 10.2 cm/minute and the force which is required to cause slippage of the insulation is measured and is a measure of the adhesion of the pulpous material to the conductor.

For a pulp-insulated conductor 30 of the cable 20 of this invention, it has been found that the adhesion value of the pulp insulation as measured by the average peak load or force required to cause relative motion between the pulpous material and the conductor is at least about 238 grams per cm of insulation. Also, it has been found that in a cable having conductors 30-30 of this invention, no more than about 10% of the conductors exhibit adhesive values less than about 120 grams/cm. In the past, conventional pulp-insulated conductors have exhibited essentially zero adhesion to the conductor. With the conductors 30-30 of the cable 20 of this invention, the measured adhesion has been in the range of 238 to 1900 grams/cm depending on gauge size.

The final pulp-insulated conductor 30 effectively has a dual insulation—an intermediate layer 33 covered by pulp. The adhesion of the pulpous material to the conductor 31 assures substantial insulation integrity and avoids the exposure of bare copper wire during the subsequent processes to which the pulp-insulation is subjected.

Because of the adhesion of the pulp layer 33 to the conductor 31, advantages other than the superior mechanical integrity can be achieved. For example, inasmuch as the pulp is now substantially guaranteed to remain on the conductor, its thickness can be reduced. For examle, the DOD of a 24 gauge pulp-insulated conductor 30 of this invention is about 7% less than that of a conventional pulp-insulated conductor; for 26 gauge, it is about 2%. This, of course, permits a greater number of insulated conductors 30-30 to be assembled in a given cross-sectional area.

The thickness, density, and amount of moisture in the pulp insulation are important insofar as capacitance requirements of a pulp-insulated cable are concerned. When two pulp-insulated conductors, each having a substantially circular cross-section, are associated together to form a twisted pair, a distance by which their centers are separated has an inversely proportional effect on mutual capacitance. Because the crush resistance of conventional pulp insulation, having a residual moisture content in the range of about 1-10%, is relatively low, one or both of the conductors may have its insulation deformed when subjected to the rigors of manufacturing process such as, for example, twisting. This generally causes the distance between conductor centers to be decreased with an accompanying undesirable increase in mutual capacitance. While this problem in conventional pulp-insulated conductors could be overcome by reducing the residual moisture content, the resulting pulp insulation would be extremely brittle and literally degrade on the conductors during twisting.

A desired mutual capacitance for the cable 20 is 83 nanofarads per mile which is equal to 52 nanofarads per kilometer. In order to provide the cable 20 with this value of mutual capacitance, it becomes necessary to prevent undue compression of the conductor insulation to maintain at least a predetermined minimum distance between the metallic conductors of each pair. For 22 gauge, the minimum center-to-center distance is about 0.12 cm; for 24 gauge, about 0.088 cm; for 26 gauge, about 0.072 cm; and for 28 gauge, about 0.055 cm. It should be realized that for other values of mutual capacitance, these distances must be changed by changing the wall thickness of the insulation.

The density and the moisture content of the pulp-insulation 32 are controlled to substantially improve its resistance to compression forces. Because the insulation 32 has superior adhesion to the conductor 31, its moisture content can be reduced to the 3 to 7% range and its density increased to prevent compacting of the insulation during twisting. These changes to moisture content and density are made by controlling the oven temperatures and by controlling the press rolls and the polishers. Moreover, the weight per foot of the pulp-insulated conductor 30 is reduced despite the increased density of the pulp insulation.

The dielectric constant on which mutual capacitance is directly proportional is increased by an increased density but decreased by a reduced moisture content. However, the capability of maintaining suitable distances between centers of the conductor pairs and the reduced moisture content offsets any adverse effect on the composite dielectric constant by the increased density.

The reduced moisture content and controlled center-to-center spacing of the conductors also is of help in offsetting the adverse contribution of the coating material to the dielectric constant of the composite cover. The coating material which is presently used has a dielectric constant, i.e., about 3 to 5, which is higher than that of the pulpous material. Notwithstanding the higher dielectric constant of the coating material of the layer 33, the offsetting influence of the reduced moisture content and controlled center-to-center distances allow the use of a smaller DOD without increasing the mutual capacitance of the cable 20.

It has been found that in order to permit a reduction in the DOD of the insulated conductor 30 while retaining acceptable capacitance characteristics, the thickness of the coating layer 33 must be relatively thin. For example, in a preferred embodiment, the thickness is in the range of about 0.0005 cm. As such, it adheres the pulp to the conductor and allows a reduced moisture content, but it is thin enough so that its impact on the composite dielectric constant as mitigated by the reduced moisture content is not unduly high.

Another advantage is provided by the reduced moisture content and the increased density of the pulp insulation 32. These changed parameters cooperate with the reduced DOD of the conductors 30-30 to provide a cable having an outer diameter which is less than that of a cable comprising conventional pulp-insulated conductors. Because of the reduced moisture content and the increased density, compression of the pulp insulation is substantially prevented. As a result, the conductor pairs can be associated together in a cable in a manner to cause a closer packing without concern about undue compression of the insulation which would adversely affect the mutual capacitance of the cable. While the reduced DOD in and of itself results in a smaller diameter cable, the ability to more closely pack the pairs leads to a still further reduction.

For another embodiment of this invention, reference is made to FIG. 4. A cable includes a plurality of pulp-insulated conductors 50 each of which includes a copper conductor 51 enclosed in a layer 53 which may be coated over the conductor and an outer pulp-insulative cover 52. The layer 53 has an effectively cellular structure which is used to control the dielectric properties of the composite cover while not adversely affecting the water-blocking, water migration, and mechanical properties of pulp insulation.

The layer 53 is comprised of an expandable material that is partially curable, because once fully cured, it would not adhere to or further react with pulpous material which is applied subsequently to the conductor to form the pulp cover 52 and adhere it to the conductor 51. Also, the material which comprises the layer 53 may be one which when partially cured is rendered substantially insoluble in water to prevent its removal from the conductors 51-51 as they are advanced through a water pulp slurry. Further, the material of the layer 53 must be such that after it has been initially treated, it does not peel off the conductor 51 when, for example, the conductor is moved into and out of engagement with portions of an apparatus (not shown) for applying the pulp cover 52.

In order to further characterize the material which comprises the layer 53 so that it will have a dielectric constant which will be less than that of the pulp cover 52, attention is drawn to the graph shown in FIG. 4A. In FIG. 4A are shown plots of dielectric constant, $\epsilon$, versus percent expansion, %E, for various copolymer binder materials, such as for example, plot 61 which has a relatively high dielectric constant at zero percent expansion down to one designated 63 which has a relatively low dielectric constant at zero percent expansion. A plot designated 62 represents a graph of 68 versus %E for typical plastic insulated conductors in which a percent expansion of 45% yields a dielectric constant of 1.64 which is less than that of pulpous material. For a DOD of 0.07874 cm, a conductor diameter of 0.04039 cm and a coaxial capacitance of 157.4 pf/meter, a well-known equation yields a dielectric constant of 1.89 for a conductor insulated only with pulpous material. In this specification, the term "percent expansion" is interpreted to mean the percent of the cross-sectional area that is comprised of voids.

From FIG. 4A it can be seen that the lower the dielectric constant of an unexpanded material, i.e., 0% expansion, the lower the percent expansion which is required in order to achieve a reduced dielectric constant. For example, an adhesive material characterized by the plot 61 having a dielectric constant of about 5 must be expanded about 90% to yield a material having a dielectric constant of 1.4. On the other hand, an adhesive material characterized by the plot 63 having a dielectric constant of about 3.0 need only be expanded 80% in order for the dielectric constant to be about 1.4.

It should be recognized that in the above examples in which the overall diameter of the pulp-insulated conductor 50 is about 0.07165 cm, the diameter of the conductor 51 itself is 0.04039 cm. With the combined thickness of the adhesive and the pulp being about 0.0156 cm, the pulp insulation 52 would have a thickness of about 0.0151 cm when the layer 53 is about 0.0005 cm.

It has been found that the optimum construction would be the largest thickness layer 53 having the greatest percent expansion that would not degrade the water-blocking and water migration characteristics of the pulp-insulation. If the thickness of the layer 53 is too great in comparison to that of the pulp for a predetermined total composite thickness, there might be insufficient pulp to be effectively water-blocking. On the other hand, if the layer 53 is too thin, then its expansion would degrade it to such an extent as to impair its adhesion capabilities. In one example, the material of the layer 53 has a maximum dielectric constant of 2 to 3, and is capable of being expanded in a range of from about 68 to 80% to have a thickness of about 0.007 cm.

Advantageously, the introduction of another parameter, i.e., percent expansion, to characterize the pulp insulated conductor permits an optimization in different ways in order to accomplish different objectives. For example, the effectively cellular layer 53 permits a reduction in DOD of the insulated conductor 50 with constant capacitance characteristics. In the alternative, an insulated conductor 50 in accordance with this invention could include the effectively cellular layer 53 with an unchanged thickness pulp cover 52, in order to improve the transmission characteristics of the insulated conductor at higher frequencies.

The expansion of the material of the layer 53 may be accomplished in any one of several ways such as, for example, by an expansion technique with the injection of air or gas. It could also be accomplished with the use of chemical blowing agents such as mixing the adhesive material with an expansion medium, such as, for example, azo-dicarbonamide.

Referring now to FIGS. 4B and 4C, there is shown another embodiment of this invention which includes a conductor 31 being covered with an intermediate layer 64 of a material in such a way as to cause openings 65-65 to be formed thereon and spaced randomly along the conductor 11. This may be accomplished by an applicator (not shown) having facilities for applying a coating on the conductor 31 in such a way that openings of a random size are produced randomly along the length and about the periphery of the conductor. This produces an effectively expanded or cellular layer and it together with the conductor 31 are embedded in a ribbon of pulpous material which is then formed about the conductor and treated as hereinbefore described.

A still further embodiment is shown in FIG. 4D and includes a conductor 31 having stripes 66-66 formed longitudinally along the conductor and spaced about its periphery. The material which comprises the stripes may be that disclosed in the hereinbefore-identified Durr et al patent and is partially cured, enclosed with a pulpous material and then further dried. The result is a pulp-insulated conductor having the structure shown in FIG. 4D with an effectively cellular structure comprising longitudinal cells created between the conductor and pulp insulation.

Cables 20-20 of this invention provide increased conductor pair density and hence allow a reduction in overall cable diameter without any reduction in jacket thickness and without any reduction in the depth and frequency of corrugations in aluminum and/or steel shields. In this way, a reduction in cable diameter is achieved without any sacrifice in the mechanical properties of the cable.

It should also be apparent that the pair density can be increased still further by allowing the mutual capacitance of any pair to be increased by about 10%. This would have an insignificant effect on the transmission characteristics of short-haul cable and yet would permit a further reduction in the DOD of each insulated conductor.

A cable system for use in an underground duct 67 (see FIG. 5) having a passageway 68 of a diameter $d_d$ includes a cable 20 of this invention and also includes a cable pulling eye 70 (see FIGS. 6 and 7). The pulling eye 70 is seen to include a tubular, steel shell 77 having an open tail end 78 through which the cable 20 is inserted, and a rounded nose end 82 opposite the open tail end. A shaft or bolt 84 is seen to pass through an opening in the rounded nose end to the exterior of the shell where an eye 86 is mounted and held in place by a cotter pin 88. A nut 96 is threaded upon the bolt 84 snugly against the outer surface of the rounded shell nose end 82 while another nut 92 is threaded about the bolt in abutment with a resilient annular seal or gasket 94.

With continued reference to FIG. 6 the cable pulling eye 70 is further seen to include a conical cable anchor block 98 threaded onto an end portion of bolt 84 within a cylindrical nose portion 95 of the shell, adjacent the shell nose end 82. A conical ring 100 is positioned about the conical anchor block 98 while a washer 102 is positioned about bolt 84 between the nut 92 and anchor block 98. The tubular shell 77 is also seen to have a cylindrical tail portion 110 of diameter $D_4$ located adjacent the open tail end 78 which is joined by a conical step 113 to the nose portion 95 having a reduced diameter $D_3$. The wall thickness $T_2$ of the shell nose portion 95 approximates the thickness of the shell wall of prior art pulling eyes while the wall thickness $T_1$ of the shell tail section 110 is substantially less than that of the nose portion.

The just-described cable pulling eye 70 may be readily mounted to the cable 20 by inserting an end of the cable through the shell open tail end 78. A central group of conductors 30-30 thus confronts the anchor block 98 through the ring 100 and then doubled back over the outer periphery of the ring along the inside surface of the shell wall. In this manner the cable 20 is mechanically coupled to the eye 86.

After the cable 20 has been attached, the shell tail section 110 is swaged whereupon the shell shape and size change from that shown in FIG. 6 to that shown in FIG. 7. From the drawings, it will be seen that the original outside diameter $D_4$ of the shell, which is the diameter of shell tail section 110, is reduced to a new maximum outside diameter $D_4'$. Thus, rather than the swaging operation now causing the maximum outside diameter of the shell to be increased, it is actually decreased. Furthermore, since the thickness $T_1$ of the shell tail section 110 is less than that of the prior art shells, its diameter prior to swaging more closely approximates that of the cable it accommodates. As an overall result, the maximum outside diameter of the shell after the swaging operation has been completed is approximately the same as that of the cable itself.

EXAMPLE 1

Each of a plurality of 26 gauge copper conductors was coated with a layer of Rohm and Haas HA-12 acrylic material having a thickness of about 0.0005 cm. Pulp insulation was applied over each of the coated conductors to form a plurality of pulp-insulated conductors each having a DOD of about 0.072 cm with the pulp having a residual moisture content of about 5%. The minimum cable average adhesion of the pulpous material to the conductor 31 was measured to be about 286 grams/cm. The cable 20 was made with 3,600 pairs of conductors and enclosed in a paper wrap to form a wrapped core having a diameter of 7.37 cm. The core was enclosed in a steel sheath and a polyethylene jacket having a 0.20 cm thickness with the outside diameter of the jacketed cable being about 8.08 cm. A pulling eye which was attached to one end of the cable had a diameter of about 8.13 cm while the duct into which the cable was pulled had a passageway diameter of about 8.9 cm. This example system represents about a 4% increase in density over that of a priorly used 3,600 pair 26 gauge pulp-insulated conductor cable which had approximately the same mutual capacitance of 52 nanofarads/kilometer.

EXAMPLE 2

A conductor 31 which is identified as a 22 gauge conductor having a diameter of 0.064 cm was covered with pulp insulation having a density in the range of 0.45 to 0.48 gms/cm$^3$. The thickness of the pulpous material was about 0.028 cm and the DOD about 0.12 cm. The minimum cable average adhesion of the insulation to the conductor was measured to be about 452 grams/cm. For drying the insulation cover, the oven 46 had an entrance zone temperature range of about 700° to 850° C. and an exit zone range of about 480°–580° C.

EXAMPLE 3

A conductor 31 which is identified as a 24 gauge conductor having a diameter of 0.051 cm was covered with pulp insulation having a density in the range of 0.470 to 0.52 gms/cm$^3$. The thickness of the pulpous material was 0.019 cm and the DOD, 0.089 cm. The minimum cable average adhesion of the insulation to the conductor was measured to be about 357 grams/cm. For drying the insulation cover, the oven 46 had an entrance zone temperature range of about 700°–850° C. and an exit zone range of about 425°–530° C.

EXAMPLE 4

A conductor 31 which is identified as a 26 gauge conductor having a diameter of 0.04 cm was covered with pulp insulation having a density in the range of 0.48 to 0.55 gms/cm$^3$. The thickness of the pulpous material was 0.016 cm and the DOD 0.072 cm. The minimum cable average adhesion of the insulation to the conductor was measured to be about 286 grams/cm. For drying the insulation cover, the oven 46 had an entrance zone temperature range of about 650°–750° C. and an exit zone range of about 425°–500° C.

EXAMPLE 5

A conductor 31 which is identified as a 28 gauge conductor having a diameter of 0.032 cm was covered with pulp insulation having a density in the range of 0.44 to 0.5 gms/cm$^3$. The thickness of the pulpous material was 0.011 cm and the DOD, 0.055 cm. The minimum cable average adhesion of the insulation to the conductor was measured to be about 238 grams/cm.

It is to be understood that the above-described arrangements are simply illustrative of the invention. Other arrangements may be devised by those skilled in the art which will embody the principles of the invention and fall within the spirit and scope thereof.

What is claimed is:

1. A pulp-insulated conductor cable which has a predetermined mutual capacitance, said cable comprising:
    a plurality of pairs of pulp-insulated conductors, each of said pulp-insulated conductors comprising:
        an elongated metallic conductor; and
        an insulation cover enclosing said metallic conductor and comprising:
            a layer of pulpous material which is sustantially concentrically disposed about said metallic conductor, and which has a moisture content and a density that are effective to cause at least a predetermined minimum distance to be maintained between said metallic conductors of each of said pairs; and
            a coating of an adhesive material which is interposed between said metallic conductor and said layer of pulpous material to bond said layer of pulpous material to said metallic conductor with at least a predetermined adhesion and which has a thickness relative to the thickness of said layer of pulpous material that is effective to control the dielectric constant of said insulation cover, said layer of pulpous material having a weight per foot which is substantially less, a density which is substantially greater and a thickness which is substantially less than the weight per foot, density and thickness of a layer of pulpous material which encloses each of a plurality of uncoated metallic conductors that comprise a cable having the predetermined material capacitance; and
    a jacket which is made of a plastic material and which encloses said plurality of pairs of pulp-insulated conductors.

2. The cable of claim 1, wherein said moisture content is in the range of about 3 to 7%.

3. The pulp-insulated conductor cable of claim 1, wherein said coating has a thickness in the range of about 0.0005 cm.

4. The pulp-insulated conductor cable of claim 3, wherein said pulpous material is bonded to said metallic conductor with an adhesion value which is at least about 238 grams per cm of insulation.

5. The cable of claim 3, wherein said metallic conductor is made of copper having an outer diameter of 0.064 cm and said layer of pulpous material has a density in the range of about 0.45 to 0.48 gms/cm$^3$ and a wall thickness of about 0.028 cm.

6. The cable of claim 3, wherein said metallic conductor is made of copper having an outer diameter of 0.051 cm and said layer of pulpous material has a density in the range of about 0.47 to 0.52 gms/cm$^3$ and a wall thickness of about 0.019 cm.

7. The cable of claim 3, wherein said metallic conductor is made of copper having an outer diameter of 0.04 cm and said layer of pulpous material has a density in the range of about 0.48 to 0.55 gms/cm$^3$ and a wall thickness of about 0.016 cm.

8. The cable of claim 3, wherein said metallic conductor is made of copper having an outer diameter of 0.032 cm and said layer of pulpous material has a density in the range of about 0.44 to 0.5 gms/cm$^3$ and a wall thickness of about 0.011 cm.

9. The cable of claim 1, wherein said at least predetermined minimum distance between said pulp-insulated conductors of each of said pairs is such that the mutual capacitance of said pulp-insulated cable is about 52 nanofarads/km.

10. The cable of claim 1, wherein said coating material has an effectively cellular structure such that the dielectric constant of the interposed layer is substantially less than the dielectric constant of pulpous material to permit a reduction in the diameter-over-dielectric of each insulated conductor while maintaining predetermined capacitance characteristics.

11. The cable of claim 10, wherein said coating has an effectively cellular structure which is interposed between said conductor and said pulpous material and which covers at least portions of said conductor, said coating having a cellular structure when said pulpous material is adhered to said conductor.

* * * * *

UNITED STATES PATENT AND TRADEMARK OFFICE
CERTIFICATE OF CORRECTION

PATENT NO. : 4,425,474

DATED : 1/10/84

INVENTOR(S) : H. E. Durr, C. B. Heard, Jr.

It is certified that error appears in the above—identified patent and that said Letters Patent is hereby corrected as shown below:

In the claims, Column 12, line 31, "material" should read --mutual--.

Signed and Sealed this

Twenty-fourth Day of July 1984

[SEAL]

Attest:

GERALD J. MOSSINGHOFF

Attesting Officer     Commissioner of Patents and Trademarks